United States Patent [19]

Takeuchi et al.

[11] Patent Number: 5,122,392
[45] Date of Patent: Jun. 16, 1992

[54] METHOD AND APPARATUS FOR MANUFACTURING MAGNETIC RECORDING MEDIUM

[75] Inventors: Hideaki Takeuchi; Junji Nakada, both of Kanagawa, Japan

[73] Assignee: Fuji Photo Film Co., Ltd., Kanagawa, Japan

[21] Appl. No.: 779,537

[22] Filed: Oct. 18, 1991

[30] Foreign Application Priority Data

Oct. 19, 1990 [JP] Japan .................. 2-279109

[51] Int. Cl.$^5$ .............................................. H01F 10/02
[52] U.S. Cl. ........................................ 427/129; 118/59;
118/65; 118/67; 118/69; 118/718; 118/720;
118/722; 118/724; 118/731; 427/130; 427/131;
427/132; 427/251; 427/255.7; 427/322;
427/328; 427/398.2

[58] Field of Search ........................ 118/59, 65, 67, 69,
118/720, 718, 722, 724, 731; 427/130–132, 251,
255.7, 322, 328, 398.2

Primary Examiner—Bernard Pianalto
Attorney, Agent, or Firm—Sughrue, Mion, Zinn, Macpeak & Seas

[57] ABSTRACT

A method and apparatus for manufacturing a magnetic recording medium at high efficiency. A flexible web is passed around first and second cooling cans. The web is reversed between the two cans so that the same surface of the web is directed to the outside on both cans. A single evaporation source produces an evaporated stream of magnetic film forming material which impinges on the web as it passes around both cans, thereby to form two films of the evaporated magnetic material on the same surface of the web.

8 Claims, 3 Drawing Sheets

METHOD AND APPARATUS FOR MANUFACTURING MAGNETIC RECORDING MEDIUM

BACKGROUND OF THE INVENTION

The present invention relates to a method and apparatus for manufacturing a magnetic recording medium, and particularly relates to a method and apparatus for manufacturing a magnetic recording medium in which a thin metal film is formed through vacuum evaporation on a continuously conveyed flexible belt-like support.

Conventionally there have been known various kinds of thin film forming methods for forming a thin metal film of a single metal, an alloy, or the like, on a base material made of a macromolecular substance or the like to thereby produce a magnetic recording medium, a thin-film integrated circuit, an energy converting device, or the like. A vacuum evaporation method is effective for efficiently forming a thin metal film on a continuously conveyed flexible belt-like support (hereinafter referred to "a web").

For example, a coating-type manufacturing method in which a powder magnetic material is applied, together with an organic binder or the like on a nonmagnetic web and then dried to thereby form a magnetic layer has been widely used conventionally to manufacture magnetic recording media.

Recently, however, it has been strongly desired to improve the maximum possible recording density of magnetic recording media, and for this purpose it is necessary to improve the magnetic force of the magnetic recording medium and reduce the thickness of the magnetic layer.

Compared with a coating-type magnetic recording medium prepared by dispersing a magnetic coating liquid containing a powdered magnetic material in an organic binder and applying the coating liquid onto a nonmagnetic web and then drying the web, in a ferromagnetic thin metal film type magnetic recording medium in which the coercive force Hc and residual magnetic flux density Br are large, the magnetic layer can be made extremely thin, and a thin metal film of a ferromagnetic metal material can be formed directly on a nonmagnetic web.

Although wet-type methods such as electrolytic plating, nonelectrolytic plating, etc., and dry type methods such as vacuum evaporation, sputtering, ion plating, CVD, etc., have been used for manufacturing ferromagnetic metal thin-film type magnetic recording media, the vacuum evaporation method is generally considered the most suitable in view of the accompanying high film forming rate and productivity.

FIG. 4 schematically shows a conventional vacuum evaporation apparatus 20. The inside of a vacuum vessel 32 is kept, by an exhaust device 33, at a pressure in a range of $10^{-4}$ Torr to $10^{-6}$ Torr. A web 30 of a high polymer material, such as polyethylene terephthalate, is pulled from a supply roll 22 by a take-up roll 23, and between rolls 22 and 23 it is wound around the circumferential side surface of a cylindrical cooling can 24. The web 30 is arranged so as to be moved and conveyed in the direction indicated by an arrow A in synchronism with the rotation of the cooling can 24.

An evaporation source 21 is provided under the cooling can 24 so as to heat and fuse an evaporation material 28 in a crucible 27 by use of an electron beam 31 to thereby generate an evaporation stream 29. The evaporation stream 29 is applied to the web 30 to thereby form a thin film on the web 30.

In order to perform continuous evaporation on the web 30, the electron beam 31 generally heats the evaporation material 28 while scanning the web in the width direction of the web. Accordingly, the crucible 27 must have a width which is at least equal to the width of the vessel in the direction parallel to the width direction of the web.

Further, in the case where a ferromagnetic metal thin-film type magnetic recording medium is manufactured using such a vacuum evaporation apparatus 20, it has been known that magnetic characteristics such as the coercive force Hc and the square ratio SQ of the magnetic layer formed on the web 30 can be improved by cutting off, through masks 25, a portion of the evaporation stream 29. The evaporation source 21 is generally provided at a position removed from the central axis of the cooling can 24. In this method, termed a "slant-incidence" evaporation method, the evaporation stream 29 is made incident on the web 30 at an oblique angle. In the slant evaporation method, the growth shape of the evaporated particles of the evaporated layer formed on the web 30 is preferable in view of certain desired characteristics of the layer.

Conventionally, in order to form two magnetic layers using an apparatus as shown in FIG. 4, for example, it is necessary that, after a first evaporation step has been completed, to reload the original roll on the feeding side, and then perform a second evaporation step. This is done not simply to form two magnetic layers, but the characteristics of the magnetic layers can be made preferable if the growth structure of the evaporation particles is a double structure in which two identical particle layers are formed one on the other.

When such a method is employed, however, there has been a serious problem in productivity. That is, after the first evaporation step is performed, the same evaporation step must be carried out again. In order to perform the second evaporation step, it is necessary to reset the wound original roll. Accordingly, not only does the work for resetting the roll become necessary, but a relatively long time is required after the vacuum in the vacuum vessel 32 is released until the required vacuum state in the vacuum vessel 32 can again be established.

Further, for example, when the apparatus disclosed in Japanese Patent Unexamined Publication No. Sho-56-72170, as shown in FIGS. 1 and 3, is used, the magnetic layers having the desired two-layer structure can be formed without resetting the original roll.

In the structure of the apparatus disclosed in Japanese Patent Unexamined Publication No. Sho-56-72170, however, two evaporation-material sources corresponding to the respective cooling cans are required for forming the two magnetic layers. If an evaporation source is provided for every layer to be formed, there is a problem that the apparatus becomes large in size.

Further, the evaporation stream obtained by evaporating material from the evaporation source as described above has its highest density in the vertical direction, that is, normal to the liquid surface of the fused evaporation material, and has a density distribution given by $\cos^n \alpha$ away from the normal axis. Thus, in a conventional slant incident evaporation apparatus in which the evaporation source is provided at a position offset from the central axis 26 of the cooling can 24, if it is desired to direct the evaporation stream onto the web at a certain incident angle, the central axis of the evaporation stream (the direction in which the density of the evaporation stream per unit solid angle is a maximum) will miss the web 30 to thereby deposit only a portion of the material contained in the evaporation stream on the web. Accordingly, the conventional vacuum evaporation method in which the evaporation material is deposited on the continuously conveyed web as described above has a problem in that the deposition efficiency of the evaporation material deposited on the web is extremely low. Although some solutions have been proposed, it has been impossible to expect much improvement in evaporation efficiency.

Accordingly, there have been problems that it has proven difficult to reduce material costs and to improve the production rate, especially in the case where relatively expensive nonferrous metals such as Co, Co alloy, etc. are used as the evaporation material, resulting in poor productivity.

SUMMARY OF THE INVENTION

It is therefore an object of the present invention to provide a method and apparatus for manufacturing a magnetic recording medium with which two magnetic layers can be continuously formed, the evaporation efficiency of the evaporation material is significantly improved, and the apparatus is not large in size.

In order to attain the above and other objects, according to one aspect of the present invention, a method is provided for manufacturing a magnetic recording medium in which a predetermined evaporation material is evaporated onto a flexible support pulled out from a supply roll while the support is being conveyed and under the condition that the support is wound around a cylindrical cooling can over a fixed angle, wherein a pair of cooling cans disposed in parallel to each other are provided, and when evaporation films are formed on the support by means of an evaporation-material generating source provided below and centrally between the cooling cans, one evaporation film is formed on the support pulled out from the supply roll on one of the cooling cans using the evaporation-material generating source, and thereafter the front and back surfaces of the support having the evaporation film formed thereon are reversed so that a second evaporation film is formed on the previously evaporated film while the film passes around the other cooling can using the same evaporation-material generating source.

Further in order to attain the above object, according to another aspect of the present invention, in an apparatus for manufacturing a magnetic recording medium in which a desired evaporation material is evaporated onto a flexible support pulled out from a supply roll while the support is being conveyed and with the support being wound around a cylindrical cooling can over a fixed angle, a pair of cooling cans is disposed parallel to one another on an upstream and a downstream side of a support running path, an evaporation-material generating source for generating an evaporation stream is provided below a substantially central portion between the cooling cans, and a reversing section for reversing the surfaces of the support is provided in the support running path between the cooling cans so that the evaporation stream can be twice evaporated onto one of the surfaces of the support by the evaporation-material generating source.

DESCRIPTION OF THE PREFERRED EMBODIMENTS

Referring to the accompanying drawings, preferred embodiments of the present invention will be described in detail hereunder.

Figure 1:
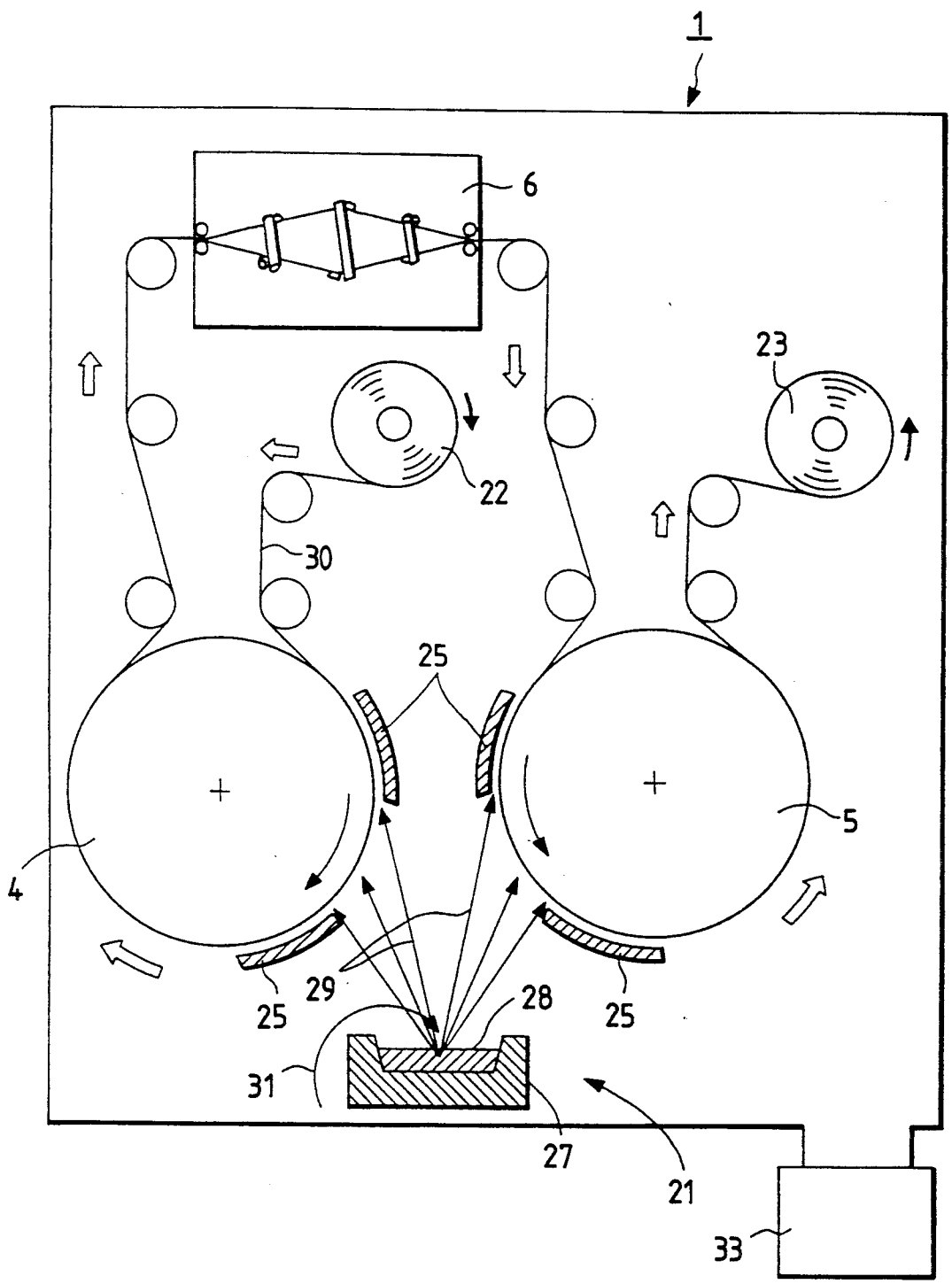
FIG. 1 is a schematic view of a preferred embodiment of an apparatus constructed according to the present invention for manufacturing a magnetic recording medium.

FIG. 1 is a schematic view of a main portion of a vacuum evaporation apparatus used in a preferred embodiment of an apparatus for manufacturing a magnetic recording medium constructed according to the present invention.

In a vacuum vessel, a running web 30 is guided along circumferential side surfaces of a pair of cylindrical cooling cans 4 and 5 disposed parallel to each other, and an evaporation source 21, which is an evaporated material generating source, is provided below and centrally between the cooling cans 4 and 5.

A conveying path is formed by a plurality of guide rolls, etc., so that the web 30 is, in sequence, pulled out from a supply roll 20, passed around the first cooling can 4, sent through a reversing section 6, passed around the second cooling can 5, and then wound up on a take-up roll 23.

The reversing section 6 for reversing the web 30 is provided in the web running path between the cooling cans 4 and 5. A first evaporated film 2 (see FIG. 3) is formed by the evaporation source 21 on the web 30 while the web 30 is passing around the first cooling can 4. The web 30 carrying the first evaporated film 2 formed thereon is reversed in the reversing section 6.

Figure 2:
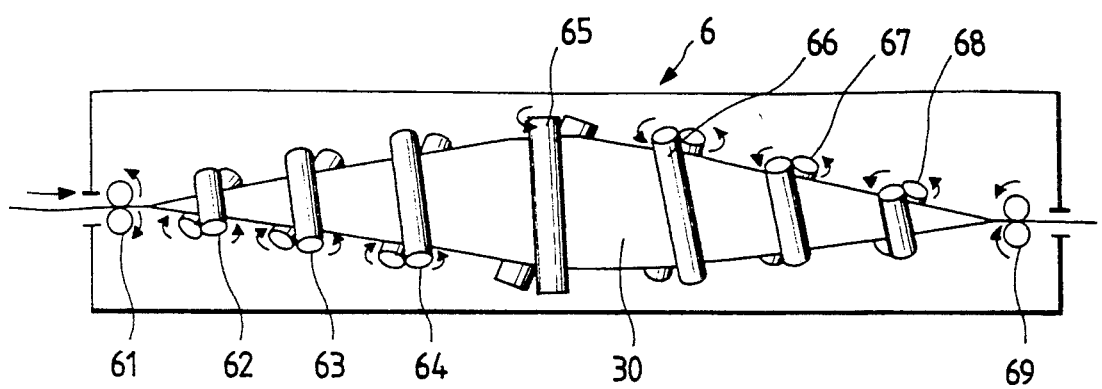
FIG. 2 is an enlarged schematic view of a reversing section in the apparatus of FIG. 1.

In the reversing section 6, for example, as shown in FIG. 2, two horizontal and parallel end roll pairs 61 and 69 are provided at the opposite ends of the reversing section 6, and roll pairs 62, 63, 64, 65, 66, 67, and 68, having rotational axes whose angle of inclination is gradually increased between the inlet and outlet ends of the reversing section 6, are provided between the end roll pairs 61 and 69. Accordingly, the web 30, which is guided while being sandwiched between the respective roll pairs in the reversing section 6, is turned over while passing through the reversing section 6.

The reversed web 30 is guided so as to be wound around the second cooling can 5 through a suitable angle, and a second evaporated film 3 (see FIG. 3) is formed on the web 30 while the web 30 is passing around the second cooling can 5. The evaporation source used for forming the second evaporated film 3 is of course the same evaporation source 21 used for forming the first evaporated film 2.

Masks 25 for excluding unused evaporated particles are provided in certain areas as desired in the evaporation range. Masks other than those specifically illustrated of course may be provided in various areas as desired.

The evaporation source 21 is constituted by a crucible 27 having a preheater for melting the evaporation material, which may be composed of ferromagnetic metals such as Fe, Co, Ni, etc., and an electron beam generator (not shown). The crucible 27 is a heat-resistant vessel made of a refractory material containing, for example, MgO, $Al_2O_3$, CaO, ZrO, etc.

To form a desired thin metal film on the web 30 by means of the evaporation source 21, an electron beam 31 is radiated on the web 30 while scanning the web 30 in the width direction of the can. The electron beam 31 has, for example, an acceleration voltage of 10 kV or more. Thus, an evaporation stream 29 is generated from the surface of the molten metal 28 irradiated by the electron beam 31 so that a thin metal film is formed on the running web 30 while the web 30 is guided on the cans 4 and 5.

In this evaporating process, a single evaporation source 21 is used. Although only about half the evaporation stream 25 has been conventionally used, the evaporation stream in the inventive apparatus 1 can be used with an efficiency twice that of the conventional apparatus.

Figure 3:
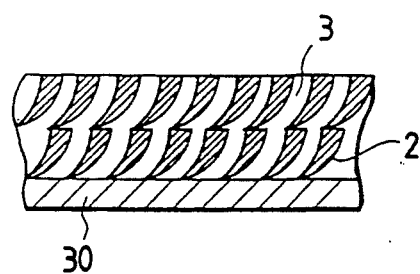
FIG. 3 is a schematic enlarged sectional view of a magnetic recording medium manufactured by the apparatus shown in FIG. 1.
Figure 4:
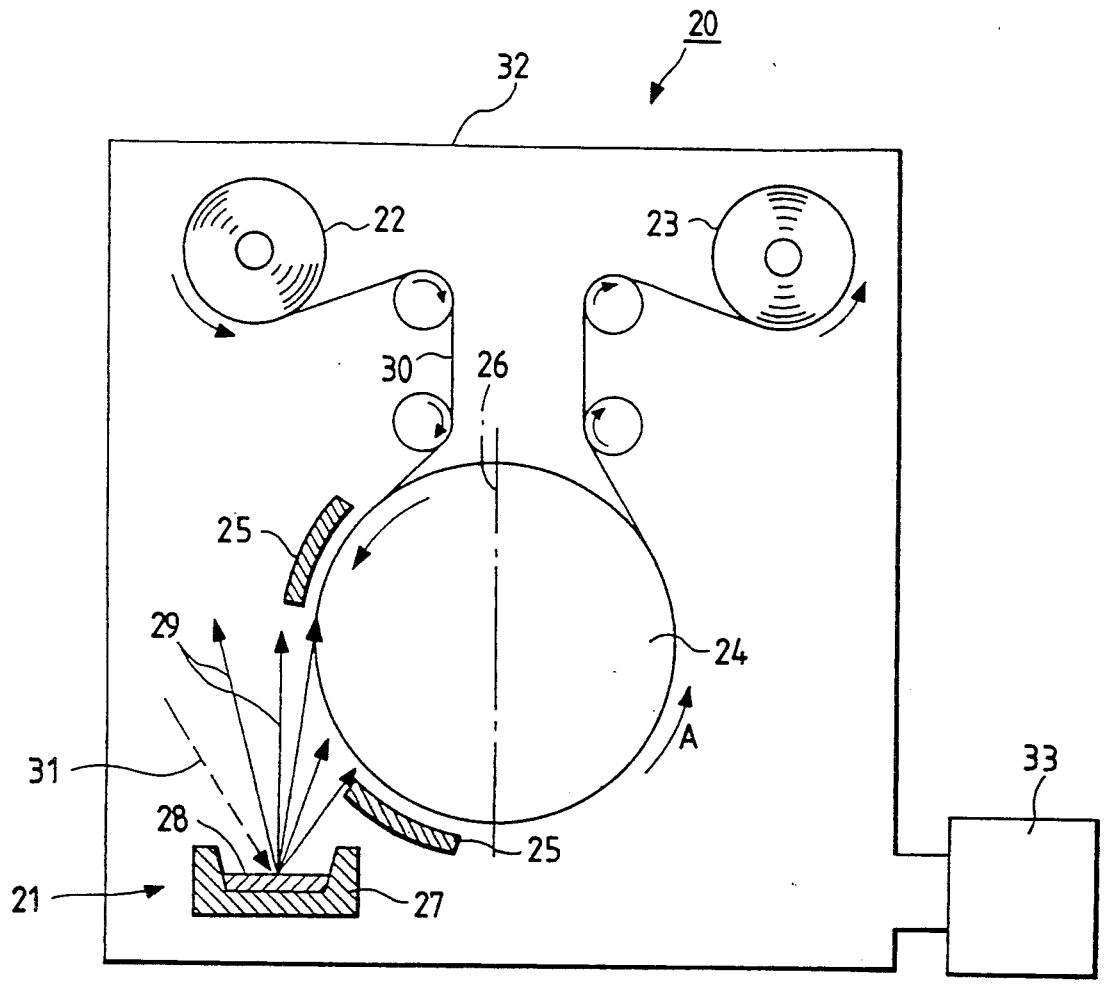
FIG. 4 is a schematic view of a conventional vacuum evaporation apparatus.

Further, as diagramatically shown in FIG. 3, the two magnetic layers formed on the web 30 may be formed in such a manner so as to yield a growth structure of evaporated particles in which both the first and second layers 2 and 3 have similar suitably curved inverted triangular forms. Accordingly, it is possible to manufacture magnetic recording media having very desirable characteristics.

That is, the central axis of the evaporation stream 29 can be directed at a desired incident angle under the same conditions with respective to both the left and right sides of the web 30, that is, with respect to the two cooling cans 4 and 5, so that the portion of the evaporation stream 29 contributing to the film formation can be used on both the left and right sides of the stream. Accordingly, not only can the evaporation efficiency of the material evaporated onto the web 30 be made high, but the incident angle of the evaporation stream 29 onto the web 30 can be easily set as desired so that magnetic characteristics such as coercive force Hc, squareness ratio SQ, etc. of the magnetic layers are made optimum. Accordingly, it is possible to obtain magnetic recording media having preferable magnetic characteristics.

Although electron beam heating is employed for heating and fusing the evaporation material in the above-described embodiment, the present invention is not limited to electron beam heating, and is applicable other heating arrangements such as resistive heating, inductive heating, or the like. Further, the structure of the reversing section is not limited to that herein disclosed, but may be suitably modified.

Further, the shapes of the crucible and guide member are not limited to those disclosed above. Of course, the crucible and guide member may have various kinds of shapes.

As described above, according to the present invention, two cooling cans are disposed parallel to one another, and only one evaporation material generating source for generating an evaporation stream is provided below and centrally between the two cooling cans so that the evaporation stream can be used on both left and right sides thereof so as to effectively use the evaporation stream. Further, since the web is reversed after the first evaporation film is formed, the second evaporation film can be formed on the first evaporation film using the same evaporation material generating source. Further, with the invention, since only one evaporation material generating source is required, the overall size of the apparatus can be reduced, while a desired two-layer structure can be obtained in which two layers having the same growth shapes of evaporation particles are formed one on the other.

According to the present invention, therefore, the efficiency of use of the material evaporated on the web can be improved, the desired two-layer structure can be formed in one evaporation step, and magnetic recording media having excellent characteristics can be manufactured at a high efficiency.

What is claimed is:

1. A method for manufacturing a magnetic recording medium comprising the steps of:
   pulling a flexible web from a supply roll;
   passing said flexible web around a first cooling can through a predetermined angle;
   passing said flexible web around a second cooling can disposed parallel to said first cooling can through a predetermined angle;
   reversing said web between said first and second cooling cans so that the same surface of said flexible web is directed to the outside on both said first and second cooling cans; and
   evaporating a magnetic film forming material from a single evaporation source onto said same surface of said web as said web passes around both said first and second cooling cans, whereby first and second evaporation films are formed on said flexible web one on the other.

2. The method for manufacturing a magnetic recording medium of claim 1, wherein said single evaporation source is disposed below and centrally between said first and second cooling cans.

3. The method for manufacturing a magnetic recording medium of claim 1, wherein said step of reversing said flexible web comprises guiding said flexible web by a plurality of pairs of rolls whose angle of inclination is gradually increased.

4. An apparatus for manufacturing a magnetic recording medium comprising:
   first and second cooling cans disposed parallel to one another;
   a reversing section disposed in a path of a flexible web between said first and second cooling cans for reversing said flexible web such that the same surface of said flexible web is directed to the outside as said flexible web passes around both said first and second cooling cans; and
   a single evaporation source for evaporating a stream of a magnetic film forming material onto said same surface of said web as said web passes around both said first and second cooling cans, whereby first and second evaporation films are formed on said flexible web one on the other.

5. The apparatus for manufacturing a magnetic recording medium of claim 4, wherein said single evaporation source is disposed below and centrally between said first and second cooling cans.

6. The apparatus for manufacturing a magnetic recording medium of claim 4, wherein said reversing section comprises a plurality of pairs of rolls whose angle of inclination is gradually increased.

7. The apparatus for manufacturing a magnetic recording medium of claim 6, wherein said reversing section further comprises a pair of inlet rolls and a pair of outlet rolls disposed parallel to one another.

8. The apparatus for manufacturing a magnetic recording medium of claim 4, further comprising at least one mask for masking unwanted portions of said evaporated stream of magnetic film forming material.

* * * * *